Patented Jan. 25, 1949

2,460,041

UNITED STATES PATENT OFFICE 2,460,041

LUBRICATING COMPOSITION

William J. Sparks, Westfield, and David W. Young, Roselle, N. J., assignors to Standard Oil Development Company, a corporation of Delaware No Drawing. Application December 21, 1945, Serial No. 636,499

4 Claims. (Cl. 252—46.6)

This invention relates to low temperature interpolymers of mono-olefins and diolefins, relates especially to high viscosity-index; extreme-pressure lubricants; and relates particularly to lubricating solutions of high diolefin copolymers containing combined phosphorus and sulphur.

Lubrication problems, especially in the automotive industry, require lubricants with as high viscosity indexes as possible, and in addition, extreme pressure properties to permit of high bearing pressures and efficient lubrication over a wide range of temperatures. However, the combination of a high viscosity index and extreme pressure properties has been difficult to attain, because of the fact that the two are to some extent incompatible.

Also it is desirable that substantial protection against weathering, rusting and corrosion be provided by materials which have at the same time substantial lubricating properties.

The present invention provides a new lubricant, new lubricant addition agent and new lubricating protective agent in the form of a copolymer of a mono-olefin, preferably an iso-olefin, with a diolefin, preferably butadiene, in which the diolefin is present in relatively high percentage, to a major proportion. This mixture is cooled to a temperature well below room temperature and polymerized by a Friedel-Crafts catalyst to a solid polymer. The resulting solid is then treated with phosphorus pentasulfide, or other compound of phosphorus and sulfur, either directly or in solution in a convenient solvent, or in solution in a hydrocarbon lubricant, to combine into the material a substantial proportion of both phosphorus and sulfur. The resulting lubricant shows a viscosity index, depending upon the amount dissolved, ranging between 100 and 140 or higher, and the viscosity index ceiling is well up towards 145.

Thus, the invention provides a new lubricant prepared by the treatment of a copolymer of a mono-olefin and a diolefin; such as iso-octene and butadiene polymerized to yield a solid polymer, with a phosphorus-sulfur compound to yield an addition agent, which in solution in the lubricant markedly improves both the viscosity index and the extreme pressure properties. Other objects and details of the invention will be apparent from the following description.

The raw materials of the present invention are a diolefin (or a multi-olefin) and a mono-olefin. For the diolefin, the preferred substance is butadiene because of its availability and relatively low cost. Alternatively, however, such diolefins as isoprene, chloroprene, piperylene, dimethylbutadiene, dimethylallyl, myrcene and the like, may be used. These are the preferred multi-olefins, but it is found that any multi-olefin having two or more double linkages per molecule and a carbon number ranging between 4 and 14 inclusive may be used. For the other raw material, the preferred mono-olefin is the octene known as "dimer" prepared by the polymerization of isobutylene. Alternatively, such mono-olefins having five or more carbon atoms per molecule, such as the various pentanes, both normal and iso, the various hexenes, heptenes, and in fact any of the mono-olefins within the range between 5 and 20 carbon atoms per molecule inclusive are usable, although, as will be obvious, some polymerize more easily than do others, and some yield better copolymers than do others.

The mono-olefin and the multi-olefin are mixed in a proportion in which the multi-olefin predominates, or at least forms a very substantial component, preferably at least 35% of the mixture, with the mono-olefin making up the remainder of the mixture. The resulting mixture is then cooled to a temperature below +10° F., the lower limit for polymerization temperature usually lying above —100° F., the preferred range lying between about +5° F. and —40° F. The cooling may be accomplished by a refrigerating jacket on the reactor or mixer, or by the direct addition of an appropriate refrigerant such as propane or butane or methyl chloride or the like.

The mixture may also contain an inert diluent, if desired, or in some instances, a single substance may serve both as refrigerant and diluent. The choice of diluent depends to some extent upon the polymerization temperature; such substances as butane or pentane or ethyl chloride or other of the moderately low-boiling saturated hydrocarbons being particularly useful. Methyl chloride may serve as refrigerant-diluent, or diluent alone, depending upon the polymerization temperature.

The cooling is conveniently obtained by the use of a relatively small amount of refrigerant directly in the reaction mixture, the refrigerant which is vaporized by the heat of reaction, being cooled and condensed by a reflux condenser and returned to the reaction mixture. The polymerization temperature is then set by the composite boiling point of the mixture, and only such refrigeration is applied to the mixture as is carried into it by the cold reflux.

The mixture is conveniently prepared in a cooled mixer, and delivered in convenient sized batches to a polymerizer equipped with a powerful stirrer to maintain rapid circulation of the cold material during the polymerization reaction.

The polymerization is conducted by the application to the cold mixture of a Friedel-Crafts catalyst, preferably in solution in a low-freezing, non-complex-forming solvent. The preferred catalyst is aluminum chloride, and the preferred solvent is ethyl or methyl chloride or carbon disulfide. Alternatively, however, such catalysts as aluminum chloro bromide or aluminum-ethoxide or boron trifluoride or the like, may be used. These latter catalysts are satisfactorily soluble in the lighter saturated hydrocarbons such as butane, pentane, hexane, solvent naphtha and the like. Alternatively, for the catalyst, any of the Friedel-Crafts catalysts pointed out by N. O. Calloway in his article on "Friedel-Crafts synthesis" printed in the issue of "Chemical Reviews," published for the American Chemical Society at Baltimore in 1935, in volume XVII, No. 3, the article beginning on page 327, the list being particularly well shown on page 375, may be used.

For the solvent, depending upon the type of Friedel-Crafts catalyst to be used, any low-freezing, non-complex-forming solvent may be used, by low-freezing there being meant a freezing point below the freezing point of water, and by non-complex-forming there being meant the capability of boiling off the solvent from the solution with a minor rise in temperature, to leave the solid a residue of the catalyst salt substantially free from solvent. For the solvent, particularly suitable substances are the mono or polyhalogen substituted aliphatic hydrocarbons having the required low freezing point. Particularly suitable are ethyl and methyl chloride, chloroform, ethylene dichloride, the various low-freezing mono and polyfluorides and fluoro-chlorides and a limited number of bromides. A particularly suitable catalyst solvent also is carbon disulfide, which shows an excellent solvent power for practically all of the Friedel-Crafts catalysts. The per cent solubility of the Friedel-Crafts substance in the solvent need not be high, since solubilities as low as $\frac{1}{10}$% to $\frac{1}{5}$% are usable, although the higher solubilities in the neighborhood of 3 to 6 or 7% are sometimes preferable with a limited number of catalysts. As above pointed out, the saturated hydrocarbons are also highly satisfactory with the catalysts which are soluble therein.

The polymerization reaction is conducted by adding the catalyst to the rapidly stirred, cold, olefinic mixture, either in the form of a fine spray on to the surface of the cold material, or in the form of a fine high-pressure jet into the body of the catalyst solution. The reaction proceeds promptly, to yield the desired polymer, which, if the polymerization is not carried too far, may remain in solution, especially if a substantial proportion of diluent is present.

The resulting polymer may be recovered in any convenient way. The cold solution may be delivered into warm water, which vaporizes the diluent and unreacted components, leaving the polymer behind in the form of a slurry or emulsion. This procedure has the advantage that a substantial proportion of the catalyst used is washed out. Alternatively, the cold mixture may be delivered to a warm hydrocarbon material in which it remains in solution, while the unreacted components and the diluent are vaporized. A desirable procedure is to discharge the cold reaction mixture directly into the hydrocarbon lubricant in which it is to be used; in either event, a thorough washing with water being advantageously conducted to remove as much as possible of the occluded or adsorbed catalyst.

The resulting polymer is then treated with phosphorus pentasulfide. If the polymer is recovered in water, it is preferably dried and may then be treated with phosphorus pentasulfide, especially if as is frequently the case, the polymer melts at a low temperature or is already fluid at room temperature. The phosphorus pentasulfide may be mixed into the liquid polymer, or the solid polymer may be put on the double roll mill, milled until it is plastic, and then the phosphorus pentasulfide added on the mill and the milling and mixing continued until the reaction has reached the desired stage. Alternatively, the polymer in solution may be treated with phosphorus pentasulfide, the mixture being heated sufficiently to facilitate the reaction. This procedure is particularly desirable where the polymer has been recovered in lubricant solution; since the reaction proceeds much more advantageously.

The treated polymer is then dissolved in a lubricant which may be fluid hydrocarbon oil or may be a heavy grease, to yield the desired lubricant. It is found that this material yields an excellent viscosity index with a desirably high viscosity index ceiling, and in addition, the presence of the sulfur and phosphorus imparts to the material advantageous extreme pressure properties which are well retained during service, since the reaction product is a stable compound which does not disintegrate during heat or pressure treatment. The treated polymer may be used alone in the lubricant, or a wide range of other substances may be added, including pour point depressers, anti-oxidants, oil soluble metal soaps, polysilicones, dyes and the like.

Example 1

A mixture was prepared consisting of approximately equal parts of butadiene and the octene known as "dimer" (di-isobutylene), together with about an equal volume of methyl chloride. This material was cooled to about −6° F. by the addition of small amounts of propane and placed in a reactor equipped with a reflux condenser, cooled by solid $CO_2$. To the mixture there was then added approximately ¼ volume of a solution of aluminum chloride in ethyl chloride. The amount of $AlCl_3$ used was 2% as calculated on the weight of active olefins. The catalyst solution was added over a time interval of approximately 30 minutes, and the amount was sufficient to carry the reaction to approximately 85% completion, the resulting solid polymer having a Staudinger molecular weight number of approximately 3000.

The polymer remained in solution in the mixture, even at the polymerization temperature of approximately −6° F. and the material was then allowed to flow through a heated coil in which the volatile portions were volatilized out, leaving the viscous molten resin substantially free from volatiles. This resin was then put into a heated Werner and Pfleiderer type kneader. To the molten resin there was then added approximately ½ part by weight of phosphorus pentasulfide, and the mixture was heated to approximately 180° C. The mixture was kneaded for approximately one hour, and then added to a good grade of lubricating oil, approximately four parts by weight of the treated resin being added to 100 parts of the oil. The oil was a high grade mineral oil having, as received, a viscosity index of 112 to 115, and a S. S. U. viscosity at 210° F. of 43 and a pour point of +5° F. The polymer dissolved promptly in the oil, and the solution was then filtered to remove residual traces of phosphorus pentasulfide. This material was found to have an excellent viscosity index of approximately 125, and on the Almen machine, excellent extreme pressure properties.

EXAMPLE 2

A polymer prepared as in Example 1 was dissolved in the proportion of 3.8 grams per 100 ml. of the above-mentioned good grade of lubricating oil. To this solution there was then added approximately 20 grams of phosphorus pentasulfide, and the mixture was heated to 180° C. and held at that temperature with continuous stirring for one hour. The mixture was then cooled to room temperature and filtered to remove traces of unreacted phosphorus pentasulfide. The clear solution was then analyzed for the amounts of combined phosphorus and combined sulfur and viscosities were determined at 100° F. and 210° F. to determine the viscosity index. Simultaneously, a portion of 7.2 grams of the same resin was dissolved in 100 ml. of the same oil; the 20 grams of the phosphorus pentasulfide were added as before, and the mixture heated to 180° C. with stirring for one hour and the mixture then cooled, filtered and analyzed. The analysis of the raw copolymer resin, before $P_2S_5$ treatment, showed the following composition:

Carbon _____ per cent__ 85.28
Hydrogen _____ do___ 12.58
Sulfur _____ do____ 0
Phosphorus _____ do____ 0
Iodine value _____ 100
Intrinsic viscosity (toluene) _____ 0.161

The analysis values and the viscosity properties of the oil itself and of the two solutions are set out in the following Table I.

Table I

| Gms. Resin per 100 ml. Base Oil | Resin Treated with $P_2S_5$ | | | | Kinematic Visc. | | |
|---|---|---|---|---|---|---|---|
| | Percent Phosphorus | | Percent Sulfur | | | | |
| | Blend Basis | Polymer Basis | Blend Basis | Polymer Basis | 100° F. | 210° F. | V. I. |
| 0 | 0 | 0 | 0 | 0 | 33.9 | 5.64 | 115 |
| 3.8 | 0.19 | 5.1 | 0.45 | 12.0 | 40.8 | 6.62 | 124 |
| 7.2 | 0.33 | 4.6 | 0.49 | 6.8 | 52.7 | 8.37 | 131 |

These results show an excellent gain in viscosity index. Tests of the oils on the Almen machine showed that the original oil without the solute carried about half of the weights whereas the two oil solutions containing the $P_2S_5$ treated polymer carried all of the weights without difficulty, showing the excellent improvement in extreme pressure properties.

EXAMPLE 3

A mixture was prepared consisting of 500 parts by weight of butadiene, 500 parts by weight of a polymerized $C_4$ cut made by the use of a

$SiO_2$—$2Al_2O_3$—$12ZnO_2$ catalyst. (Added information on the catalyst will be found in Ind. and Eng. Chem., vol. 37, No. 6, pages 543 to 545, by Charles L. Thomas.) This material had a boiling point within the range between 350° F. and 375° F. and was a polymer of the normal and iso-butenes. To this mixture there was then added approximately 1500 parts by weight of methyl chloride and the material was cooled to a temperature of —10.3° F. When the material was fully cooled, a catalyst consisting of aluminum chloride in solution in ethyl chloride in a concentration of 4.8 grams per 100 cc. was added at the rate of about 6.7 parts by weight per minute.

The reaction required about twenty minutes to start, and was completed in approximately an hour and a quarter, as shown by the following time table:

Reaction under reflux

| Time | Temp., °F. | Ml. Cat. Added | Remarks |
|---|---|---|---|
| 2:45 | —10.3 | | added 1500 parts $CH_3Cl$. |
| 2:50 | —11.2 | 40 | no reflux. |
| 2:55 | —13.0 | 80 | Do. |
| 3:05 | —13.0 | 150 | Do. |
| 3:10 | —4.0 | 185 | very little reflux. |
| 3:20 | +9.5 | 250 | good reflux. |
| 3:25 | +9.5 | 275 | Do. |
| 3:35 | +7.5 | 345 | Do. |
| 3:45 | +5.9 | 415 | reflux drop by drop. |
| 4:00 | +9.5 | 515 | little reaction. |
| 4:22 | +10.4 | 670 | off—added water to kill reaction. |

The resulting product was a soft, solid resin which was treated with 5000 parts by weight of hot water to remove as much as possible of the catalyst and to volatilize out the methyl chloride and any unpolymerized olefinic material. The material was found to have a Staudinger molecular weight number of about 5000, an iodine number by the Wijs method of approximately 122, and a melting point by the ring and ball method of 84° C. The polymer was found to be readily soluble in mineral lubricating oil and in 2% and 6% showed an improvement in viscosity index as shown in the following table:

Lubricating oil (43 S. S. V. at 210° F.—V. I.=115)

| Percent Polymer in Oil | Saybolt S. S. V @ 210° F. | C. S. @ 100° F. | C. S. @ 210° F. | V. I. |
|---|---|---|---|---|
| 0 | 43 | | 5.13 | 115.0 |
| 2 | 48.04 | 41.19 | 6.69 | 124.3 |
| 6 | 58.11 | 62.44 | 9.68 | 133.0 |

Portions of these solutions of polymer in lubricating oil containing respectively 2% and 6% of the polymer were each treated with 2% by weight of phosphorus pentasulfide, the mixture being heated to 170° C. for fifteen minutes, cooled, filtered and then tested for viscosity and viscosity index, with the results shown in the following table:

| Percent Butadiene Copolymer-$P_2S_5$ treated in Lubricating Oil | C. S. @ 100° F. | C. S. @ 210° F. | V. I. |
|---|---|---|---|
| 2 | 41.19 | 6.69 | 124.3 |
| 6 | 62.43 | 9.67 | 133.0 |

Chemical analysis of the filtered oil solution indicated that the 2% polymer blend contained 0.24% of phosphorus and 0.61% of sulfur. The 6% polymer solution after the $P_2S_5$ treatment was found to contain 0.41% phosphorus and 0.88% sulfur; showing that in the 2% solution a little under half of the phosphorus pentasulfide had combined and in the 6% solution, approximately ⅔ of the P₂S₅ had combined.

These several solutions were tested on the Almen machine and it was found that the simple solution of polymer in oil carried about half of the weights, whereas the P₂S₅ treated solutions carried all of the weights without difficulty, showing that the material had excellent extreme pressure properties.

EXAMPLE 4

A mixture was prepared consisting of 500 parts by weight of liquid cyclopentadiene and 500 parts by weight of liquid diisobutylene. This mixture was cooled to approximately —20° F. and to it was added approximately 1500 parts by weight of methyl chloride at a temperature of approximately —20° F. To this cooled liquid mixture there was then added approximately 200 parts by weight of a clear solution of aluminum chloride in ethyl chloride having a concentration of approximately 4.2%; sufficient of this solution being added to carry into the reaction mixture approximately 2 parts by weight of aluminum chloride, calculated as solid aluminum chloride. The addition of the catalyst solution was extended over a period of approximately 45 minutes. This amount of catalyst was sufficient to polymerize approximately 63% of the olefinic mixture. The polymerization reaction was then killed by the addition of approximately 20 parts by weight of isopropyl alcohol diluted with approximately 10 parts by weight of water.

The polymerizate mixture was then washed with cold water and thereafter heated to remove as much as possible of the methyl chloride solvent. This removal required heating of the mixture to approximately 250° F. The resin was then allowed to cool to room temperature and dissolved in a portion of good grade mineral oil having a viscosity index of approximately 100. In 4% concentration in the oil, the polymer produced in the oil a viscosity index of 122.

This solution was then treated with 5% by weight of phosphorus pentasulfide and heated with stirring to 180° C. for 30 minutes. The solution was then cooled and filtered to remove uncombined phosphorus pentasulfide. The solution had the same viscosity index as before but had in addition extreme pressure properties sufficiently good to carry all of the weights on the Almen machine.

The above examples show the production of liquid lubricants. The process is however equally applicable to the production of greases which may contain any of the ordinary grease addition agents. Such grease compounds containing the high diolefin polymer are particularly suitable as slushing materials and protective coatings either with or without the phosphorus pentasulfide treatment. A grease so applied, especially if it contains a susbtantial proportion to a major proportion of the polymer, has a heavy body which readily forms a protective film having definite drying properties. Thus the slushing coat stays in place well and with the passage of time, hardens down into a moderately strong film by oxidation from atmospheric air without at the same time losing its lubricating properties nor its protective properties against weathering, corrosion or the like on underlying metal surfaces.

In the above examples, also, there is shown only phosphorus pentasulfide but the reaction is equally satisfactory with phosphorus sesqui sulfide; with phosphorus tri sulfide and with phosphorus di sulfide; these compounds giving excellent control of the respective amounts of sulfur and phosphorus combined into the polymer.

Thus, the invention treats a high diolefin copolymer with a phosphorus-sulfur compound and utilizes it in solution in a lubricating oil to improve simultaneously both viscosity index and the extreme pressure properties.

While there are above disclosed but a limited number of embodiments of the process and product of the invention, it is possible to provide still other embodiments without departing from the inventive concept herein disclosed, and it is therefore desired that only such limitations be imposed on the appended claims as are stated therein or required by the prior art.

The invention claimed is:

1. A lubricant material having improved viscosity index and superior extreme pressure properties comprising a mineral oil base lubricating material having in solution therein a copolymer of approximately equal parts of butadiene and diisobutylene; the said copolymer being treated with a phosphorus sulfide to incorporate therein phosphorus and sulfur, said treated copolymer being per se a solid resin having a melting point by the ball and ring method in the general neighborhood of 83° C. and a Staudinger molecular weight in the general neighborhood of 3000 to 5000, an iodine number of about 100 to 122; and containing, combined thereinto, about 0.19% to about 0.41% of phosphorus and about 0.45% to 0.88% of sulfur by weight, based on the weight of the total composition sufficient to yield a viscosity index ceiling of approximately 145, and extreme pressure properties sufficiently good to carry all the weights on the Almen machine under shock loading.

2. A lubricant composition having an improved viscosity index and extreme pressure properties, comprising a mineral oil base lubricant solution of 2 to 7.2% by weight, based on the total composition, of a solid copolymer prepared from a major proportion of a diolefin having from 4 to 14 carbon atoms per molecule and a minor proportion of isoolefin having 5 to 20 carbon atoms per molecule, said coplymer being formed at a temperature within the range of +15° F. to —50° F. in the presence of a Friedel-Crafts catalyst and being treated after copolymerization with a phosphorus sulfide to incorporate phosphorus and sulfur combined in said copolymer in proportions of about 4.6% to 5.1% of phosphorus and about 6.8% to 12% of sulfur, based on the weight of polymer to impart sufficient extreme pressure properties to said composition to carry all the weights of the Almen machine.

3. A lubricating composition having an improved viscosity index and extreme pressure properties, comprising a mineral oil base lubricant solution of 2 to 7.2% by weight, based on the total composition, of a solid copolymer prepared from a major proportion of butadiene and a minor proportion of isoolefin of 5 to 20 carbon atoms copolymerized at a temperature within the range of +15° F. to —50° F. in the presence of a Friedel-Crafts catalyst and being treated after copolymerization with a phosphorus sulfide to incorporate combined phosphorus and sulfur in said copolymer in of about 0.19% to 0.41% phosphorus and about 0.45% to 0.88% of sulfur, based on the weight of the total composition proportions to impart substantial extreme pressure properties to said lubricating composition.

4. A lubricating composition consisting essentially of a mineral base lubricating oil containing in solution a quantity, sufficient to substantially raise the composition viscosity index, of a copolymer of a major proportion of butadiene and a minor proportion of isooctene copolymerized at a temperature within the range of +15° F. and −50° F. in the presence of a Friedel-Crafts catalyst and treated after copolymerization with phosphorus pentaulfide, said copolymer having a molecular weight of about 3000 to 5000 containing chemically combined phosphorus and sulfur in quantities of about 4.6% to 5.1% phosphorus and 6.8% to 12.0% sulfur, based on the weight of the polymer sufficient to impart substantial extreme pressure properties to said composition.

WILLIAM J. SPARKS.
DAVID W. YOUNG.

REFERENCES CITED

The following references are of record in the file of this patent:

UNITED STATES PATENTS

| Number | Name | Date |
|---|---|---|
| 2,109,772 | Frolich | Mar. 1, 1938 |
| 2,316,078 | Loane | Apr. 6, 1943 |
| 2,327,705 | Frolich | Aug. 24, 1943 |
| 2,356,127 | Thomas et al. | Aug. 22, 1944 |
| 2,356,128 | Thomas | Aug. 22, 1944 |
| 2,381,907 | Hughes | Aug. 14, 1945 |